US010648350B2

(12) United States Patent
Choi

(10) Patent No.: US 10,648,350 B2
(45) Date of Patent: *May 12, 2020

(54) RETAINER FOR GAS TURBINE BLADE, TURBINE UNIT AND GAS TURBINE USING THE SAME

(71) Applicant: DOOSAN HEAVY INDUSTRIES & CONSTRUCTION CO., LTD., Changwon-si, Gyeongsangnam-do (KR)

(72) Inventor: Jae Hyeong Choi, Daegu (KR)

(73) Assignee: Doosan Heavy Industries Construction Co., Ltd, Gyeongsangnam-do (KR)

( * ) Notice: Subject to any disclaimer, the term of this patent is extended or adjusted under 35 U.S.C. 154(b) by 168 days.

This patent is subject to a terminal disclaimer.

(21) Appl. No.: 15/842,294

(22) Filed: Dec. 14, 2017

(65) Prior Publication Data

US 2018/0291751 A1 Oct. 11, 2018

(30) Foreign Application Priority Data

Apr. 11, 2017 (KR) ........................ 10-2017-0046874

(51) Int. Cl.
*F01D 5/30* (2006.01)
*F01D 5/32* (2006.01)
(Continued)

(52) U.S. Cl.
CPC ............. *F01D 5/326* (2013.01); *F01D 5/081* (2013.01); *F01D 5/087* (2013.01); *F01D 5/3015* (2013.01); *F01D 5/082* (2013.01); *F01D 5/3007* (2013.01); *F01D 11/006* (2013.01); *F05D 2220/30* (2013.01); *F05D 2220/32* (2013.01); *F05D 2240/30* (2013.01); *F05D 2260/30* (2013.01)

(58) Field of Classification Search
CPC ...... F01D 5/3015; F01D 5/3007; F01D 5/326; F01D 5/081; F01D 5/087; F01D 5/088
See application file for complete search history.

(56) References Cited

U.S. PATENT DOCUMENTS 5,951,250 A * 9/1999 Suenaga ................ F01D 5/085 415/115
6,416,282 B1 * 7/2002 Beeck ..................... F01D 5/087 415/115

(Continued)

FOREIGN PATENT DOCUMENTS

EP 2009236 A2 12/2008
EP 2236759 A1 10/2010

(Continued)

*Primary Examiner* — Ninh H. Nguyen
*Assistant Examiner* — Behnoush Haghighian
(74) *Attorney, Agent, or Firm* — Invenstone Patent, LLC

(57) ABSTRACT

A retainer for a gas turbine blade that inhibits deviation of a rotating blade mounted on a rotor of a gas turbine, can include: a retainer frame disposed at one side of the rotating blade and configured to form an inside chamber through which cooled air is introduced, between the retainer frame and the rotating blade; a barrier wall formed between the retainer frame and the rotating blade and configured to divide the inside chamber into a plurality of cooling chambers; and a fixing unit disposed at one side of the retainer frame and configured to fix the retainer frame to the rotor.

18 Claims, 2 Drawing Sheets

(51) Int. Cl.
*F01D 5/08* (2006.01)
*F01D 11/00* (2006.01)

(56) References Cited

U.S. PATENT DOCUMENTS

| | | | | |
|---|---|---|---|---|
| 8,206,119 | B2 * | 6/2012 | Liotta | F01D 5/3015 416/220 R |
| 8,616,832 | B2 * | 12/2013 | Smoke | F01D 5/087 415/115 |
| 8,696,320 | B2 * | 4/2014 | Harris, Jr. | F01D 5/26 416/244 R |
| 8,708,652 | B2 * | 4/2014 | Caprario | F01D 5/3015 416/220 R |
| 9,605,552 | B2 * | 3/2017 | Wondrasek | F01D 11/006 |
| 10,125,621 | B2 * | 11/2018 | Barry | F01D 5/081 |
| 2005/0232751 | A1 * | 10/2005 | Townes | F01D 5/081 415/115 |
| 2008/0181768 | A1 * | 7/2008 | Brucher | F01D 5/3015 415/170.1 |
| 2010/0014986 | A1 * | 1/2010 | Traverso | F01D 5/081 416/97 R |
| 2011/0129342 | A1 | 6/2011 | Smoke et al. | |
| 2012/0107136 | A1 * | 5/2012 | Buchal | F01D 5/3015 416/97 R |
| 2016/0090854 | A1 * | 3/2016 | Webb | F01D 5/081 416/220 R |
| 2016/0146101 | A1 * | 5/2016 | Lee | F02C 3/04 415/68 |
| 2016/0273370 | A1 * | 9/2016 | Belshaw | F01D 5/081 |
| 2017/0096903 | A1 | 4/2017 | Schiessl et al. | |

FOREIGN PATENT DOCUMENTS

| | | | |
|---|---|---|---|
| EP | 3070268 | A2 | 9/2016 |
| GB | 2435909 | A | 9/2007 |
| JP | 60-209603 | A | 10/1985 |
| JP | 09-273401 | A | 10/1997 |
| JP | 2008-169838 | A | 7/2008 |
| JP | 2010-216474 | A | 9/2010 |
| JP | 2015-516052 | A | 6/2015 |
| KR | 10-1624064 | B1 | 5/2016 |

* cited by examiner

RETAINER FOR GAS TURBINE BLADE, TURBINE UNIT AND GAS TURBINE USING THE SAME

CROSS-REFERENCE TO RELATED PATENT APPLICATION

This application claims the benefit of Korean Patent Application No. 10-2017-0046874, filed Apr. 11, 2017, the disclosure of which is herein incorporated by reference in its entirety.

BACKGROUND OF THE INVENTION

1. Field of the Invention

The present invention relates to a retainer for a gas turbine blade, a turbine unit, and a gas turbine using the same, and more particularly, to a retainer for a gas turbine blade having an improved structure in which a rotating blade of a gas turbine is fixed, a turbine unit, and a gas turbine using the same.

2. Description of the Related Art

Examples of a turbine that is a machine device that attains a rotational force with an impulsive force or a reaction force using the flow of a compressive fluid, such as steam or gas, include a steam turbine using steam, and a gas turbine using high-temperature combustion gas.

Among them, the gas turbine largely includes a compressor, a combustor, and a turbine. The compressor includes an air introduction port through which air is introduced, and a plurality of compressor vanes and a plurality of compressor blades, which are alternately disposed within a compressor casing.

The combustor supplies fuel to the air compressed by the compressor, ignites the fuel by using a burner so that a high-temperature and high-pressure combustion gas can be generated.

In the turbine, a plurality of turbine vanes and a plurality of turbine blades are alternately disposed within a turbine casing. Also, a rotor is disposed to pass through the compressor, the combustor, the turbine, and the center of an exhaust chamber.

The rotor is configured in such a way that both ends thereof are rotatably supported by a bearing. A plurality of discs are fixed to the rotor so that the blades are connected to the plurality of discs, respectively, and simultaneously a driving shaft, such as a power generator, is connected to an end of a side of the exhaust chamber.

Because such a gas turbine does not include a reciprocating motion machine, such as a piston for a four-stroke engine, there is no mutual frictional part, such as a piston-cylinder, consumption of a lubricating oil is very low, amplitude that is the feature of the reciprocating motion machine is greatly reduced, and high-speed motion is possible.

In a brief description of the operation of the gas turbine, air compressed by the compressor is mixed with fuel and is combusted so that high-temperature combustion gas is generated, and the generated combustion gas is injected into a turbine. While the injected combustion gas passes through the turbine vanes and the turbine blades, rotational force is generated, and thus, the rotor rotates.

A retainer is mounted on the rotor of the turbine and is disposed around a combined part of the turbine blades and the rotor in a circumferential direction. A cooling space into which cooled air is introduced, is formed between the retainer and the rotor, and the cooled air is introduced into the cooling space so that the rotor and the turbine blades are inhibited from being overheated.

However, because one cooling space is formed in a rear surface of a retainer according to the related art, the cooled air is moved directly to the outside before cooling the combined part of the turbine blades and the rotor. Thus, the cooling efficiency of the turbine blades and the rotor may be lowered.

SUMMARY OF THE INVENTION

The present invention provides a retainer for a gas turbine blade having an improved structure in which a cooled air flow path is improved so that the cooling efficiency of a rotor and blades can be improved, a turbine unit, and a gas turbine using the same.

According to an aspect of the present invention, there is provided a retainer for a gas turbine blade, which inhibits deviation of a rotating blade mounted on a rotor of a gas turbine, the retainer including: a retainer frame disposed at one side of the rotating blade and configured to form an inside chamber through which cooled air is introduced, between the retainer frame and the rotating blade; a barrier wall formed between the retainer frame and the rotating blade and configured to divide the inside chamber into a plurality of cooling chambers; and a fixing unit disposed at one side of the retainer frame and configured to fix the retainer frame to the rotor.

A cooled air flow path may be formed between the rotating blade and the rotor, the inside chamber and the cooled air flow path may communicate with each other, and the cooled air may be supplied into the inside chamber.

One end of the rotating blade may have a fir tree shape, and the retainer frame may be formed at both sides of the rotating blade. The barrier wall may include a plurality of barrier wall members spaced apart from one another in a radial direction of the rotor, and communication holes may be formed in the plurality of barrier wall members so that the plurality of cooling chambers communicate with one another through the communication holes. In addition, the communication holes formed in the barrier wall members may be formed to cross other communication holes formed in an adjacent barrier wall member.

According to another aspect of the present invention, there is provided a turbine unit including: a casing including a gas inlet formed at one side thereof and a gas outlet formed at the other side thereof, the casing configured to form a gas flow space inside thereof; a torque tube rotatably mounted in the gas flow space inside the casing; a rotor coupled to the torque tube and rotating together with the torque tube; a rotating blade mounted on the rotor; a retainer including a retainer frame disposed at one side of the rotating blade and configured to form an inside chamber through which cooled air is introduced between the retainer frame and the rotating blade, a barrier wall formed between the retainer frame and the rotating blade and configured to divide the inside chamber into a plurality of cooling chambers, and a fixing unit disposed at one side of the retainer frame and configured to fix the retainer frame to the rotor; and a fixed blade formed at an inner wall of the casing.

A cooled air flow path may be formed between the rotating blade and the rotor, the inside chamber and the cooled air flow path may communicate with each other, and the cooled air may be supplied into the inside chamber.

According to another aspect of the present invention, there is provided a gas turbine including: a compressor unit configured to compress air supplied from the outside; a combustor unit configured to combust the compressed air supplied from the compressor unit and a fuel so as to generate an operating gas; and a turbine unit including a casing including a gas inlet formed at one side thereof and a gas outlet formed at the other side thereof, the casing configured to form a gas flow space inside thereof, a torque tube rotatably mounted in the gas flow space inside the casing, a rotor coupled to the torque tube and rotating together with the torque tube, a rotating blade mounted on the rotor, a retainer including a retainer frame disposed at one side of the rotating blade and configured to form an inside chamber through which cooled air is introduced between the retainer frame and the rotating blade, a barrier wall formed between the retainer frame and the rotating blade and configured to divide the inside chamber into a plurality of cooling chambers, and a fixing unit disposed at one side of the retainer frame and configured to fix the retainer frame to the rotor; and a fixed blade formed at an inner wall of the casing.

BRIEF DESCRIPTION OF THE DRAWINGS

The above and other features of the present invention will become more apparent by describing in detail exemplary embodiments thereof with reference to the attached drawings in which.

DETAILED DESCRIPTION OF THE INVENTION

Figure 1:
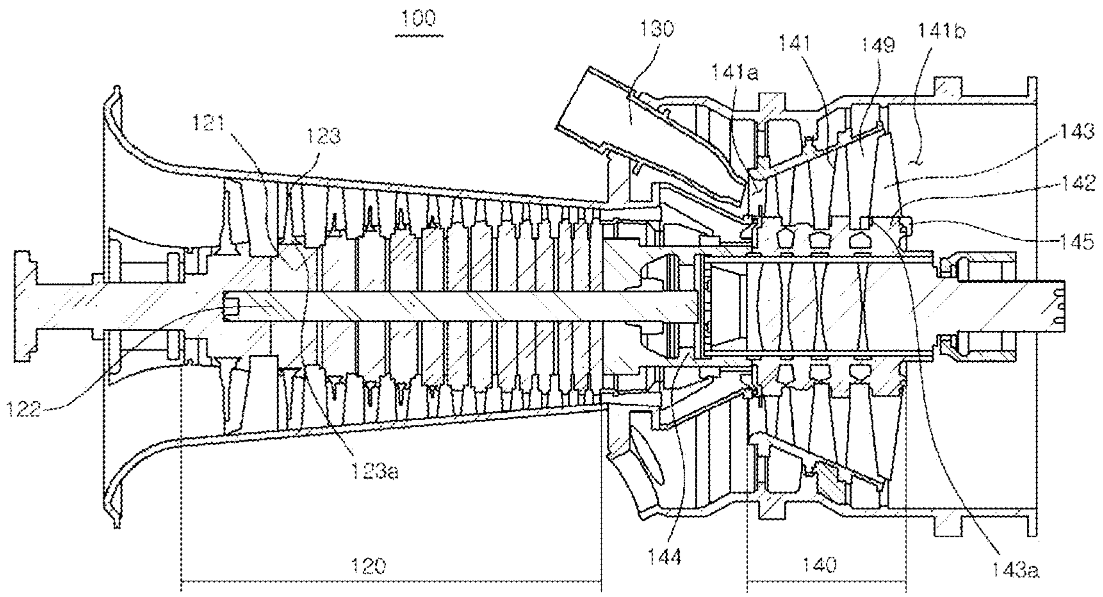
FIG. 1 is a cross-sectional view showing a schematic structure of a gas turbine according to an embodiment of the present invention.
Figure 2:
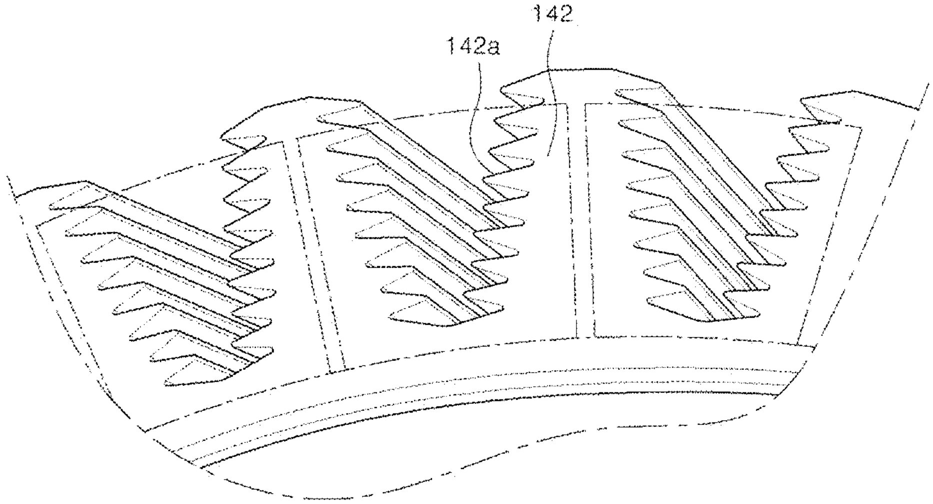
FIG. 2 is a partial perspective view of a rotor according to an embodiment of the present invention.

Hereinafter, a turbine according to an embodiment of the present invention will be described with reference to the attached drawings.

Referring to FIGS. 1 through 4, a gas turbine 100 according to an embodiment of the present invention includes a compressor unit 120, a combustor unit 130, and a turbine unit 140.

The compressor unit 120 is disposed at an upstream side based on a flow of air and compresses air supplied from the outside. The compressor unit 120 includes a plurality of compressor rotor discs 121. The plurality of compressor rotor discs 121 are coupled to one another by a central tie rod 122 in an axial direction.

The compressor rotor discs 121 are aligned along the axial direction while the tie rod 122 passes through the center of the compressor rotor discs 121.

A plurality of blades 123 are coupled to an outer circumferential surface of the compressor rotor discs 121 in a radial direction. A dovetail 123*a* is provided at one end of each of the blades 123 and is coupled to each of the compressor rotor discs 121.

The tie rod 122 is disposed to pass through the center of the plurality of compressor rotor discs 121, and a downstream end of the tie rod 122 is inserted into and fixed to a torque tube 144 that transfers driving force of the turbine unit 140 to the compressor unit 120.

The compressor unit 120 rotates the blades 123 due to the driving force of the turbine unit 140, compresses outside air, and supplies the compressed outside air to the downstream combustor unit 130.

The combustor unit 130 includes one or a plurality of combustors and a fuel nozzle that injects fuel into the one or the plurality of combustors.

A plurality of combustors are arranged in a casing having a cell shape. Each of the plurality of combustors includes a combustion unit that combusts the fuel to generate high-temperature compressed gas, and a transition piece that guides the high-temperature operating gas generated in the combustion unit to the turbine unit 140.

When the fuel and the compressed gas supplied from the compressor unit 120 are supplied to the plurality of combustors of the combustor unit 130, the fuel and the compressed air are combusted inside the combustors, and operating gas generated after combustion passes through the transition piece and is supplied to the downstream turbine unit 140.

The turbine unit 140 includes a casing 141, a rotor 142, a rotating blade 143, the torque tube 144, a retainer 145, and a fixed blade 149.

The casing 141 includes a gas inlet 141*a* through which the operating gas supplied from the combustor unit 130 is introduced and that is formed at one side of the casing 141, and a gas outlet 141*b* through which the operating gas after the rotating blade 143 rotates, is discharged and that is formed at the other side of the casing 141. A diffuser may be provided at the gas outlet 141*b* so as to smoothly discharge the operating gas. Also, a gas flow space in which the operating gas flows, is formed inside the casing 141.

The torque tube 144 is rotatably disposed in the center of the gas flow space inside the casing 141. The torque tube 144 has a hollow tubular shape, and an upstream end of the torque tube 144 is coupled to the tie rod 122, and a downstream end of the torque tube 144 is coupled to the rotor 142.

A plurality of rotating blades 143 are mounted on an outer circumferential surface of the rotor 142. Each of the rotating blades 143 includes a dovetail 143*a* formed at an end of the rotor 142. The dovetail 143*a* is slidably inserted into and coupled to a coupling groove 142*a* formed in the outer circumferential surface of the rotor 142. The dovetail 143*a* has a fir tree shape, and the coupling groove 142*a* has a shape corresponding to the fir tree shape of the dovetail 143*a*.

A pair of retainers 145 are mounted on both sides of the dovetail 143*a* of each of the rotating blades 143 inserted into the rotor 142.

Each of the pair of retainers 145 includes a retainer frame 146 and a fixing unit 150.

The retainer frame 146 has a plate shape, and an inside chamber 148 in which cooled air may be accommodated, is formed in a surface of the retainer frame 146 facing the rotating blade 143. The retainer frame 146 is disposed at one side of the rotating blade 143 and the rotor 142, and forms the inside chamber 148 into which the cooled air for cooling the dovetail 143*a* of the rotating blade 143 and the rotor 142 is introduced.

In addition, the inside chamber 148 is divided into three, i.e., first through third cooling chambers 148*a*, 148*b*, and 148*c* by means of a barrier wall formed at one side of the retainer frame 146. In the current embodiment, the inside chamber 148 is divided into three cooling chambers. However, the number of cooling chambers is not limited thereto, and the inside chamber 148 may be divided into a plurality of cooling chambers according to design conditions.

The barrier wall 147 includes a plurality of barrier wall members spaced apart from one another in the radial direction of the rotor 142 and forms the plurality of cooling chambers 148*a*, 148*b*, and 148*c* formed by dividing the inside chamber 148 in the radial direction of the rotor 142. As the inside chamber 148 is divided into the plurality of cooling chambers 148*a*, 148*b*, and 148*c* in the radial direction of the rotor 142 by means of the plurality of barrier wall members, the cooled air is delayed from flowing to the radial outside of the rotor 142 and flows from the inside to the outside of each rotating blade 143 sequentially so that the cooling efficiency of the rotor 142 and the rotating blades 143 can be improved.

Figure 4:
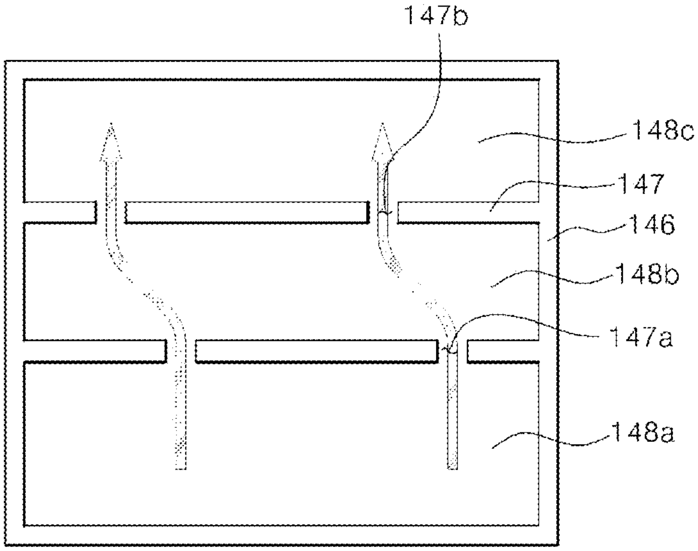
FIG. 4 is a rear view of a retainer according to an embodiment of the present invention.

Referring to FIG. 4, first and second communication holes 147*a* and 147*b* through which a plurality of cooling spaces communicate with one another, are formed in the barrier wall members. The first and second communication holes 147*a* and 147*b* for guiding appropriate flow of the cooled air inside the cooling chambers 148*a*, 148*b*, and 148*c* may be formed in crossing positions of other communication holes of the adjacent barrier wall member.

Figure 3:
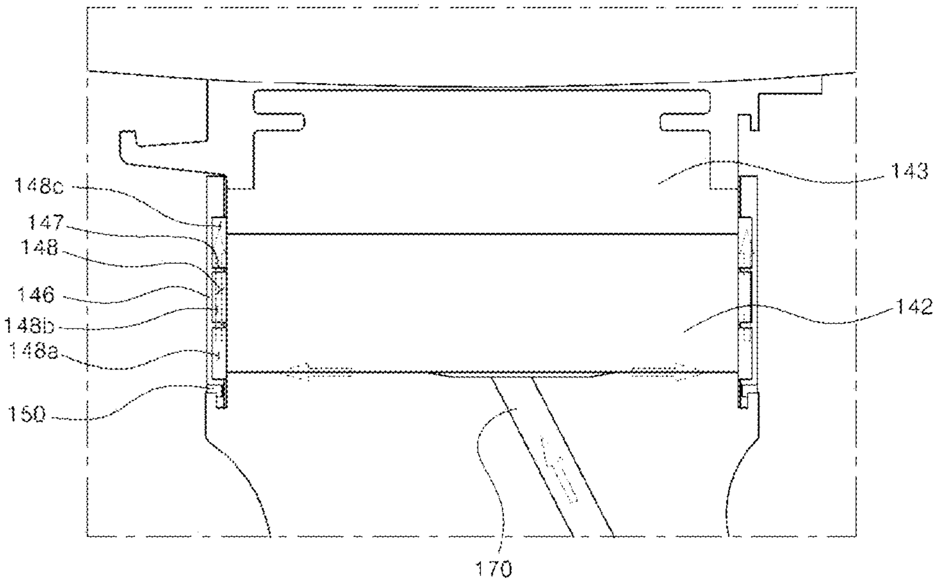
FIG. 3 is a cross-sectional view of a combined part of turbine blades and a rotor of a turbine unit according to an embodiment of the present invention.

Referring to FIG. 3, a cooled air flow path 170 that supplies the cooled air into the coupling groove 142*a*, is formed at one side of the coupling groove 142*a* of the rotor 142. The cooled air supplied via the cooled air flow path 170 may cool the dovetail 143*a* of the rotating blade 143. In addition, the cooled air flow path 170 may extend between the rotor 142 and the rotating blade 143, and the extending cooled air flow path 170 may communicate with the inside chamber 148 of each retainer 145.

Thus, the cooled air supplied via the cooled air flow path 170 is supplied into the first cooling chamber 148*a* that is the inner most chamber of the inside chamber 148 of the retainer 145, in the radial direction of the rotor 142.

The cooled air supplied into the first cooling chamber 148*a* cools the innermost part of the dovetail 143*a* and the rotor 142 sufficiently and then is transferred to the second cooling chamber 148*b* through the first communication hole 147*a*. The cooled air supplied to the second cooling chamber 148*b* also cools the dovetail 143*a* of the adjacent rotating blade 143 and the rotor 142 and then is transferred to the third cooling chamber 148*c* through the second communication hole 147*b*.

In this case, the first communication hole 147*a* and the second communication hole 147*b* are formed in crossing positions. Thus, the cooled air supplied through the first communication hole 147*a* is delayed from flowing into the third cooling chamber 148*c* through the second communication hole 147*b* so that the cooled air in the second cooling chamber 148*b* may cool the dovetail 143*a* of the rotating blade 143 and the rotor 142.

In a retainer for a gas turbine blade, a turbine unit and a gas turbine using the same according to an embodiment of the present invention, the flow of cooled air that flows in a cooling space formed at one side of a rotating blade and a rotor is controlled so that the cooled air can flow from the inside to the outside of the rotating blade sequentially and thus the cooling efficiency of the rotating blade and the rotor can be improved.

As described above, the structure of a retainer for supporting blades is improved so that the cooling efficiency of the blades and the rotor can be improved.

In addition, according to the present invention, a cooling space formed in a rear surface of the retainer is divided into a plurality of parts in a radial direction so that cooled air can be sequentially moved to the radial outside of the rotor. Thus, cooling of a rotating blade is smoothly performed so that the durability of the blades can be improved.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A retainer for a gas turbine blade, which inhibits deviation of a rotating blade mounted on a rotor of a gas turbine, the retainer comprising:

a retainer frame disposed at one side of the rotating blade and configured to form an inside chamber through which cooled air is introduced between the retainer frame and the rotating blade, the inside chamber formed by a pair of circumferentially extending sides and a pair of radially extending sides;

a barrier wall formed between the retainer frame and the rotating blade and configured to divide the inside chamber into a plurality of cooling chambers, the barrier wall comprising a plurality of barrier wall members spaced apart from one another in the radial direction of the rotor; and a fixing unit that is disposed at one side of the retainer frame and includes a body and a flange extending from the body in a radial direction of the rotor to fix the retainer frame to the rotor, wherein each barrier wall member of the barrier wall is connected to the pair of radially extending sides of the retainer.

2. The retainer of claim 1, wherein a cooled air flow path is formed between the rotating blade and the rotor, the inside chamber and the cooled air flow path communicate with each other, and the cooled air is supplied into the inside chamber via the cooled air flow path.

3. The retainer of claim 1, wherein one end of the rotating blade has a fir tree shape.

4. The retainer of claim 1, wherein the retainer frame is formed at both sides of the rotating blade.

5. The retainer of claim 1, wherein the barrier wall extends in a circumferential direction of the rotor, wherein the plurality of cooling chambers communicate with one another through communication holes formed in the barrier wall and spaced apart from each other in the circumferential direction of the rotor, wherein the barrier wall has a circumferential length and includes a portion in which no communication holes are formed, and wherein the communication holes occupy less of the circumferential length than the portion in which no communication holes are formed.

6. The retainer of claim 1, wherein the barrier wall comprises a plurality of barrier wall members spaced apart from one another in a radial direction of the rotor, wherein the plurality of cooling chambers communicate with one another through communication holes formed in each barrier wall member of the plurality of barrier wall members and spaced apart from each other, wherein the communication holes formed in one barrier wall member of the plurality of barrier wall members are respectively misaligned with the communication holes formed in a barrier wall member of the plurality of barrier wall members that is adjacent to the one barrier wall member, so that the cooled air supplied to one cooling chamber of the plurality of cooling chambers is delayed before flowing into a cooling chamber of the plurality of cooling chambers that is adjacent to the one cooling chamber.

7. A turbine unit comprising:

a casing configured to form a gas flow space communicating with each of a gas inlet and a gas outlet formed at opposite sides of the casing, the casing having an inner wall on which a fixed blade is disposed;

a torque tube rotatably mounted in the gas flow space inside the casing;

a rotor coupled to the torque tube and rotating together with the torque tube;

a rotating blade mounted on the rotor;

a retainer comprising a retainer frame disposed at one side of the rotating blade and configured to form an inside chamber through which cooled air is introduced between the retainer frame and the rotating blade, the inside chamber formed by a pair of circumferentially extending sides and a pair of radially extending sides, a barrier wall formed between the retainer frame and the rotating blade and configured to divide the inside chamber into a plurality of cooling chambers, the barrier wall comprising a plurality of barrier wall members spaced apart from one another in the radial direction of the rotor, and a fixing unit that is disposed at one side of the retainer frame and includes a body and a flange extending from the body in a radial direction of the rotor to fix the retainer frame to the rotor, wherein each barrier wall member of the barrier wall is connected to the pair of radially extending sides of the retainer.

8. The turbine unit of claim 7, wherein a cooled air flow path is formed between the rotating blade and the rotor, the inside chamber and the cooled air flow path communicate with each other, and the cooled air is supplied into the inside chamber via the cooled air flow path.

9. The turbine unit of claim 7, wherein one end of the rotating blade has a fir tree shape.

10. The turbine unit of claim 7, wherein the retainer frame is formed at both sides of the rotating blade.

11. The turbine unit of claim 7, wherein the barrier wall extends in a circumferential direction of the rotor, wherein the plurality of cooling chambers communicate with one another through communication holes formed in the barrier wall and spaced apart from each other in the circumferential direction of the rotor, wherein the barrier wall has a circumferential length and includes a portion in which no communication holes are formed, and wherein the communication holes occupy less of the circumferential length than the portion in which no communication holes are formed.

12. The turbine unit of claim 7, wherein the barrier wall comprises a plurality of barrier wall members spaced apart from one another in a radial direction of the rotor, wherein the plurality of cooling chambers communicate with one another through communication holes formed in each barrier wall member of the plurality of barrier wall members and spaced apart from each other, wherein the communication holes formed in one barrier wall member of the plurality of barrier wall members are respectively misaligned with the communication holes formed in a barrier wall member of the plurality of barrier wall members that is adjacent to the one barrier wall member, so that the cooled air supplied to one cooling chamber of the plurality of cooling chambers is delayed before flowing into a cooling chamber of the plurality of cooling chambers that is adjacent to the one cooling chamber.

13. A gas turbine comprising:

a compressor unit configured to compress air supplied from the outside;

a combustor unit configured to combust the compressed air supplied from the compressor unit and a fuel so as to generate an operating gas; and a turbine unit comprising a casing configured to form a gas flow space in which the operating gas flows, the gas flow spacing communicating with each of a gas inlet and a gas outlet formed at opposite ends of the casing, the casing having an inner wall on which a fixed blade is disposed, a torque tube rotatably mounted in the gas flow space inside the casing, a rotor coupled to the torque tube and rotating together with the torque tube, a rotating blade mounted on the rotor, a retainer comprising a retainer frame disposed at one side of the rotating blade and configured to form an inside chamber through which cooled air is introduced between the retainer frame and the rotating blade, the inside chamber formed by a pair of circumferentially extending sides and a pair of radially extending sides, a barrier wall formed between the retainer frame and the rotating blade and configured to divide the inside chamber into a plurality of cooling chambers, the barrier wall comprising a plurality of barrier wall members spaced apart from one another in the radial direction of the rotor, and a fixing unit that is disposed at one side of the retainer frame and includes a body and a flange extending from the body in a radial direction of the rotor to fix the retainer frame to the rotor, wherein each barrier wall member of the barrier wall is connected to the pair of radially extending sides of the retainer.

14. The gas turbine of claim 13, wherein a cooled air flow path is formed between the rotating blade and the rotor, the inside chamber and the cooled air flow path communicate with each other, and the cooled air is supplied into the inside chamber via the cooled air flow path.

15. The gas turbine of claim 13, wherein one end of the rotating blade has a fir tree shape.

16. The gas turbine of claim 13, wherein the retainer frame is formed at both sides of the rotating blade.

17. The retainer of claim 1, wherein the flange of the fixing unit is configured to be inserted into a recess that is formed an exposed outer surface of the rotor and extends in the radial direction of the rotor.

18. The retainer of claim 17, wherein the retainer frame includes a rotating blade side disposed toward the rotating blade and a rotor side disposed toward the rotor and is configured to be inserted into the recess together with the flange of the fixing unit.

* * * * *